United States Patent Office 3,137,694
Patented June 16, 1964

3,137,694
METHOD FOR ISOLATING TETRAMERIC CYANOGEN HALIDE FROM ITS REACTION MIXTURE
Jean Riethmann, Allschwil, and Hans E. Wegmueller, Riehen, Switzerland, assignors to J. R. Geigy A.G., Basel, Switzerland
No Drawing. Continuation of application Ser. No. 83,364, Jan. 18, 1961. This application Oct. 3, 1963, Ser. No. 313,423
Claims priority, application Switzerland Jan. 19, 1960
10 Claims. (Cl. 260—249.5)

This application is a continuation of our pending patent application Serial No. 83,364, filed January 18, 1961, now abandoned.

The present invention concerns new tetrameric cyanogen halides and a method for the production thereof.

Among the polymeric cyanogen halides, in particular cyanuric chloride has attained great importance in chemical technique as intermediate product for the production of dyestuffs, of optical brightening agents and of herbicides. This importance as intermediate product is due to the graduated reactivity of the chlorine atoms bound to the ring which can be replaced in steps by, for example, amino groups, organically substituted amino groups, ether groups or thioether groups.

It has now been found that tetrameric cyanogen halides, the structure of which will be discussed below to show that they are of the Formula I

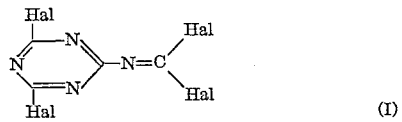
(I)

wherein the "Hal" represents identical or different halogen atoms, especially chlorine, and also bromine or fluorine, are also distinguished by the great reactivity of their halogen atoms and are valuable starting materials for various types of chemical syntheses.

The new tetrameric cyanogen halides are prepared conforming to this invention by polymerising a monomeric cyanogen halide in the presence of hydrogen halide and an amide of a secondary nitrogen base and a low fatty acid, isolating by usual methods the tetrameric cyanogen halide formed from the reaction mixture and liberating it from accompanying substances.

For instance, tetrameric cyanogen chloride is obtained besides cyanuric chloride, if monomeric cyanogen chloride is polymerised in the presence of hydrogen chloride and of amides of secondary nitrogen bases and low fatty acids. In this polymerisation, the use of halogenated hydrocarbons as inert solvents is recommended.

Among the amides used according to the invention for guiding the cyanogen halide polymerisation towards the formation of the tetramer, dimethyl formamide is particularly preferred. Relatively small amounts of these amides, especially of dimethyl formamide, mixed with hydrogen halides should be used for this purpose. For example, for an amount of 10 g.-mol of the monomeric cyanogen chloride, about 10 to 50 g., advantageously about 20 g. of a solution of hydrogen chloride in dimethyl formamide are sufficient. Mixtures of hydrogen chloride in dimethyl formamide in ratios of about 1:1 to 2.5:1 are suitable catalysts for the process according to the invention.

Chiefly halogenated aliphatic and aromatic hydrocarbons are used as inert organic diluents, for example chloroform, methylene chloride, dichloroethylene, tetrachloroethylene, chlorobenzene, dichlorobenzenes, chlorotoluenes, trichlorobenzenes, chloronaphthalenes, further fluorinated hydrocarbons such as, e.g. fluoroform, as well as alkanes containing fluorine and chlorine, in which case the reaction is performed, if necessary, in a closed vessel. However, it is also possible to use other inert organic solvents and diluents, for example open chain or cyclic ethers such as dialkyl ethers or dioxanes. The easily volatile chloroform is a preferred solvent because it can be easily removed from the reaction mixture by distilling off. The presence of slight amounts of hydroxyl compounds, for example the presence of traces of moisture or of alkanols has a favourable influence on the formation of the tetramer. On making use of all these favourable factors, in addition to cyanuric chloride, up to 40% or more of tetrameric cyanogen chloride is obtained according to the invention.

Also on polymerising cyanogen chloride in a closed vessel, tetrameric cyanogen chloride is obtained as well as cyanuric chloride in the presence of tertiary fatty acid amides and of hydrogen halide. In this reaction, the liquid or liquified components and reaction products play the part of inert organic solvents. For example, the monomeric cyanogen chloride can be introduced in portions or continuously, if necessary under pressure, into the reaction vessel containing liquified hydrogen chloride and a tertiary fatty acid amide, or, especially in laboratory, the gaseous hydrogen chloride can be introduced under pressure into an autoclave containing a mixture of monomeric cyanogen chloride and a tertiary fatty acid amide.

In all these cases, the tetrameric cyanogen chloride formed in the reaction mixture is isolated if necessary after removal of inert organic diluents, e.g., by distilling off, by separation from the cyanuric chloride which is always also formed. The cyanuric chloride can be removed, for example, by sublimation or the tetrameric cyanogen chloride can be extracted with liquid, advantageously aliphatic or also alicyclic hydrocarbons, and then distilling off these solvents and rectifying depending on the residue obtained.

Tetrameric cyanogen chloride is an oily liquid which is as clear as water; density $d_{20}^4 = 1.681$; refractive index $n_{20} = 1.5759$; B.P. at 14 mm. Hg pressure = 126° C. (not decomposed); and under these conditions it can be distilled. According to analysis, it has the formula $C_4N_4Cl_4$ from which the molecular weight of 246 is calculated. This weight agrees well with the molecular weight determined ebullioscopically in benzene. On hydrolysing in water at 20° C., a quantitative yield of 2-amino-4,6-dichloro-1,3,5-triazine is formed while 1 mol of carbon dioxide and 2 mols of hydrogen chloride are split off, whilst hydrolysis in water at 100° produces 1 mol of 2,4,6-trihydroxy-1,3,5-triazine, 1 mol of carbon dioxide, 1 mol of ammonium chloride and 3 mols of hydrogen chloride. These findings as well as synthesis of the substance by chlorinating 4,6-dichloro-1,3,5-triazine-2-isothiocyanate, prove that it has the structural Formula I given above. This formula is also confirmed by the IR and UV spectra, by the resonance energy of the compound (measured by heat of combustion) and the dipole moment. Tetrameric cyanogen chloride has the formula

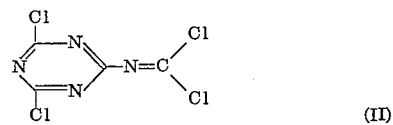
(II)

Cyanogen bromide, on polymerisation under otherwise the same conditions, reacts more violently than cyanogen chloride. When using cyanogen bromide as starting material besides

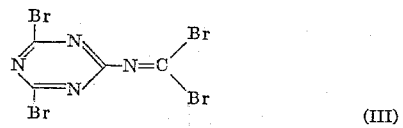

many decomposition products are formed. If in the polymerisation, mixtures containing more cyanogen chloride than cyanogen bromide are used or if in the polymerisation of cyanogen chloride, according to the invention, mixtures of hydrogen bromide and dimethyl formamide are used instead of mixtures of hydrogen chloride and dimethyl formamide, cyanogen halides of the Formula I in which single halogens are bromine are obtained, e.g., compounds corresponding to the general Formula I and represented by the formula $C_4N_4Cl_n(Br_{4-n})$ where $n$ may be 0, 1, 2, 3 or 4.

Compounds of the general Formula I and corresponding to the formula $C_4N_4Cl_n(F_{4-n})$, wherein $n$ may be 0, 1, 2, 3 or 4, can be obtained from the tetrameric cyanogen chloride by reacting the tetrameric cyanogen chloride with antimony trifluoride or by reacting the tetrameric cyanogen chloride with alkali metal fluorides, e.g., potassium fluoride, sodium fluoride, in the presence of a catalyst such as antimony trioxide ($Sb_2O_3$) or antimony pentachloride ($SbCl_5$).

Other fluorides that can be employed in place of the alkali metal fluorides are calcium fluoride, zinc fluoride, ammonium fluoride, mercury (I) fluoride, sodium hydrogen fluoride, potassium hydrogen fluoride. Moreover instead of an alkali metal fluoride, anhydrous hydrofluoric acid can be employed. The preferred reaction temperature lies between 100° and 200° C., although somewhat lower temperatures and somewhat higher temperatures can be used. Halogenated hydrocarbons, e.g., 1,2-dichloroethane, 1,2-dichloroethylene, perfluoroheptane may be used as solvents as well as aromatic hydrocarbons as benzene.

The tetrameric cyanogen halides are compounds which react quickly and are stable on exclusion of moisture. All halogen atoms are very mobile and can be replaced easily at once and also gradually by the radicals of amines, alcohols, phenols mercaptans, etc.

Thus, on being reacted with dyestuffs containing acylatable amino groups, new dyestuffs are obtained which also contain reactive halogen atoms, which dyestuffs can be chemically fixed onto cellulose fibres in the presence of alkaline substances. The tetrameric cyanogen halides are also valuable starting materials for the production of medicines, textile auxiliary products and especially of herbicides, insecticides, fungicides etc.

Turning again to the polymerisation of the monomeric cyanogen halide, a temperature range of 0–70° C., especially of 20–40° C., at atmospheric pressure has been found effective for the polymerisation. However, the reaction may be carried out at higher temperatures with an increase of pressure, e.g., 200° C. at 40 atmospheres. With higher temperature and an increase in pressure, the speed of the reaction is quickened. The preferred amide employed in the polymerisation is dimethyl formamide. However, diethyl formamide, dimethyl acetamide, diethyl acetamide etc. can be employed. Preferable liquids utilised for the extraction (isolation) of the tetrameric cyanogen halide are aliphatic, aromatic or alicyclic hydrocarbons and mixtures thereof having a boiling point of 50–150° C., e.g., hexane, octane, cyclohexane, cycloheptane etc.

The following examples illustrate the invention. Parts are given as parts by weight. The temperatures are in degrees centigrade.

*Example 1*

223 parts of cyanogen chloride are poured while cooling with ice into a freshly prepared 0–5° cold solution of 6 parts of dimethyl formamide in 450 parts of moist chloroform which solution has been saturated with hydrogen chloride. After removal of the cooling bath, the temperature slowly rises to 50–55°. To complete the reaction, the mixture is refluxed for 16 hours. The chloroform is then distilled off and replaced by 300 parts of petroleum ether. The cyanuric chloride thus precipitated is filtered off from the solution which has been cooled to 0–5°. On distilling the petroleum ether filtrate, 87 parts of tetrameric cyanogen chloride are obtained, B.P. 117–142° at 13 mm. Hg pressure. The crude product is left to stand for 3 days in a closed vessel so that dissolved cyanuric chloride separates out and this is then filtered off. The tetrameric cyanogen chloride obtained in this manner has a content of 97–98.5%.

18 parts of unreacted cyanogen chloride are regained after the polymerisation from the cold trap fitted at the end of the apparatus.

The yield of pure tetrameric cyanogen chloride, calculated on the amount of cyanogen chloride reacted, is 36.8%.

45% of pure cyanuric chloride can be obtained by sublimation from the crude cyanuric chloride obtained by filtration.

*Example 2*

A mixture of 450 parts of chlorobenzene, 3 parts of ethanol and 6 parts of dimethyl formamide is saturated with hydrogen chloride at 0–5°. 243 parts of cyanogen chloride are poured, while cooling, into this freshly prepared solution. On removal of the cooling bath, the temperature rises to 50–55° within 2–4 hours. On completion of the polymerisation, the reaction mixture is kept for 2 hours at 60–65°. The chlorobenzene is then distilled off under reduced pressure and replaced by 300 parts of petroleum ether. The solution is cooled to 0–5° and the cyanuric chloride which has separated in crystalline form is filtered off. 91 parts of tetrameric cyanogen chloride are obtained by distilling the petroleum ether filtrate, M.P. 121–142° at 13 mm. Hg pressure. Dissolved cyanuric chloride is removed by letting the crude product stand for 3 days in a closed vessel and then filtering it off. 79.5 parts of tetrameric cyanogen chloride having a content of 98.5% are obtained in this manner.

During the polymerisation, 25 parts of the non-reacted cyanogen chloride are regained from the cold trap at the end of the apparatus.

*Example 3*

A mixture of 450 parts of chloroform, 3 parts of ethanol and 6 parts of dimethyl formamide is saturated at 0–5° with 14 parts of hydrogen bromide. 226 parts of cyanogen chloride are carefully poured, while cooling with ice, into this freshly prepared solution. On removal of the cooling bath, the temperature rises slowly to 50–55°. The polymerisation is completed by refluxing the reaction mixture for several hours. The reaction product is worked up in the usual way. By distillation of the petroleum ether extract under reduced pressure, 67 parts of a mixed polymer of the general formula $C_4N_4Cl_n(Br_{4-n})$ wherein $n$ represents 0, 1, 2, 3 or 4, are obtained as a pale yellow coloured oil which boils at 118–157° under 14 mm. Hg pressure. It has the following composition.

Found: C, 19.5%; N, 22.2%; Cl, 54.5%; Br, 4.9%.

During the polymerisation, 30 parts of non-reacted cyanogen chloride are regained from the cold trap at the end of the apparatus.

*Example 4*

The following example is illustrative of the use of a tetrameric halide in the fungicide field:

16.6 parts of well dried sodium salt of 4-chlorothiophenol are added gradually in portions while stirring at 5° to the solution of 4.92 parts of tetrameric cyanogen chloride in 200 parts of benzene. The suspension is stirred for 14 hours at 20° and then refluxed for 24 hours. After cooling, sodium chloride which precipitates in crystalline form is filtered off. The benzene is then distilled off and the colourless residue is recrystallised twice from isopropyl ether. Colourless crystals which melt at 152–156° are obtained.

A 1% solution in acetone of these colourless crystals radically kills the following fungi: *Clasterosporium carp., Coniothyrium d.*

We claim:

1. In a process for the production of tetrameric cyanogen halide which comprises
   polymerizing monomeric cyanogen halide in the presence of a substantially saturated solution of hydrogen halide in an inert organic solvent and an amide of a secondary nitrogen base and a lower fatty acid and isolating the tetrameric cyanogen halide from the reaction mixture, the improvement consisting of
   (a) removing the inert organic solvent and adding to the residual mixture a sufficient amount of a liquid lower aliphatic saturated hydrocarbon to precipitate cyanuric halide from the resulting solution,
   (b) separating the precipitated cyanuric halide from the solution and
   (c) evaporating lower aliphatic saturated hydrocarbon from the remaining solution, thereby recovering the tetrameric cyanogen halide therefrom.

2. The improvement described in claim 1 wherein the cyanogen halide is cyanogen chloride and the hydrogen halide is hydrogen chloride.

3. The improvement described in claim 1 wherein the cyanogen halide is a mixture of cyanogen bromide and cyanogen chloride.

4. The improvement described in claim 1 wherein the cyanogen halide is cyanogen chloride and the hydrogen halide is hydrogen bromide.

5. The improvement described in claim 1 wherein the amide is dimethyl formamide.

6. The improvement described in claim 1 wherein the solvent is a halogenated hydrocarbon.

7. The improvement described in claim 1 wherein the inert organic solvent is chloroform.

8. The improvement described in claim 1 wherein the inert organic solvent is chlorobenzene.

9. The improvement described in claim 1 wherein the lower aliphatic saturated hydrocarbon is petroleum ether.

10. The improvement described in claim 1 wherein separation of the precipitate of cyanuric chloride from the solution under step (b) is carried out at a temperature ranging from about 0° to 5° C.

References Cited in the file of this patent
UNITED STATES PATENTS

| | | |
|---|---|---|
| 3,053,843 | Gysin et al. | Sept. 11, 1962 |
| 3,080,367 | Von Friedrich et al. | Mar. 5, 1963 |